A. E. NESCHER.
FLUID PIPE COUPLING FOR RAILWAY CARS.
APPLICATION FILED OCT. 23, 1917.
1,387,508.
Patented Aug. 16, 1921.
4 SHEETS—SHEET 4.
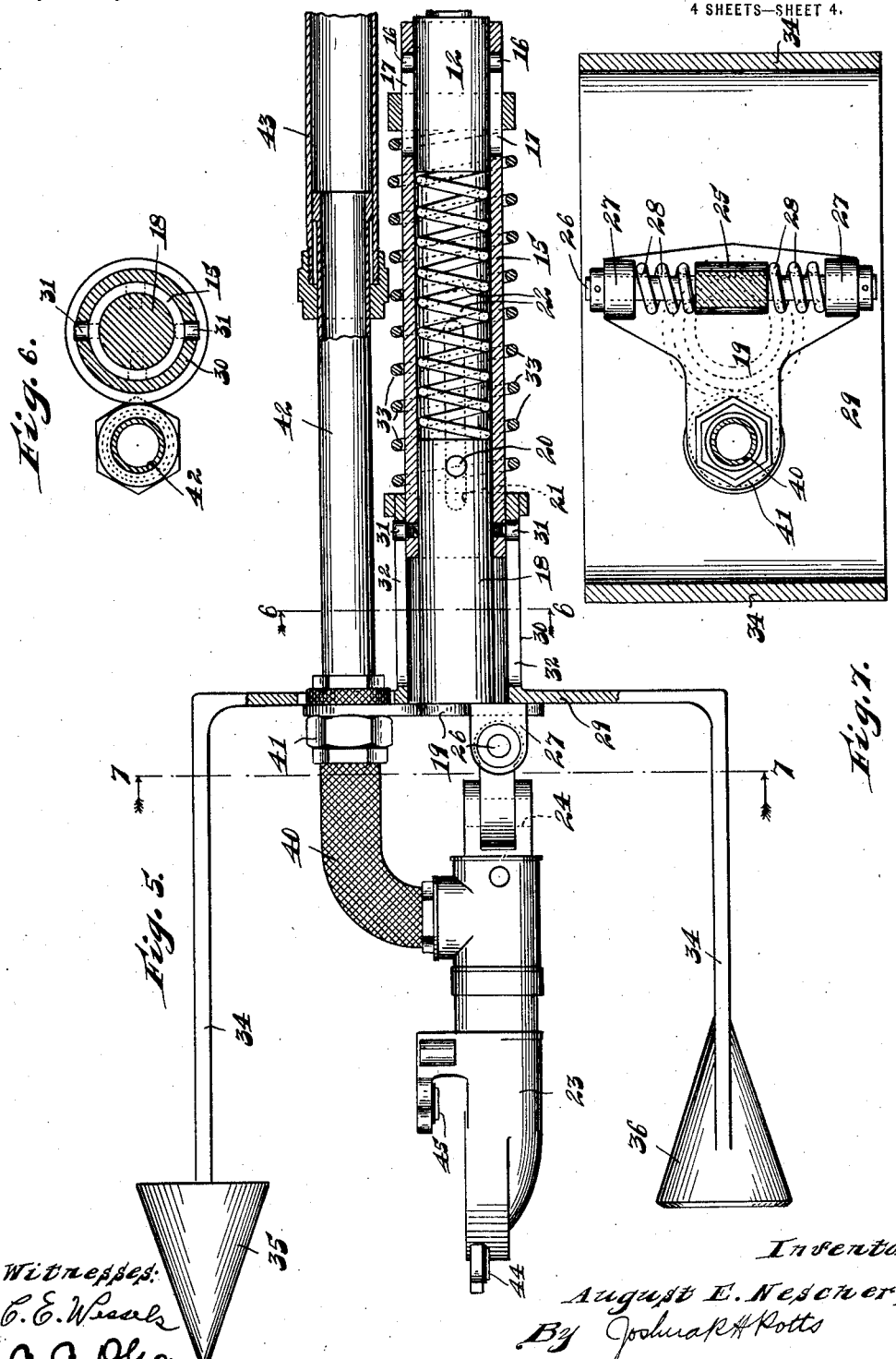
Witnesses:
C. E. Wessels
O. O. Olin
Inventor:
August E. Nescher,
By Joshua R H Potts
his Attorney.

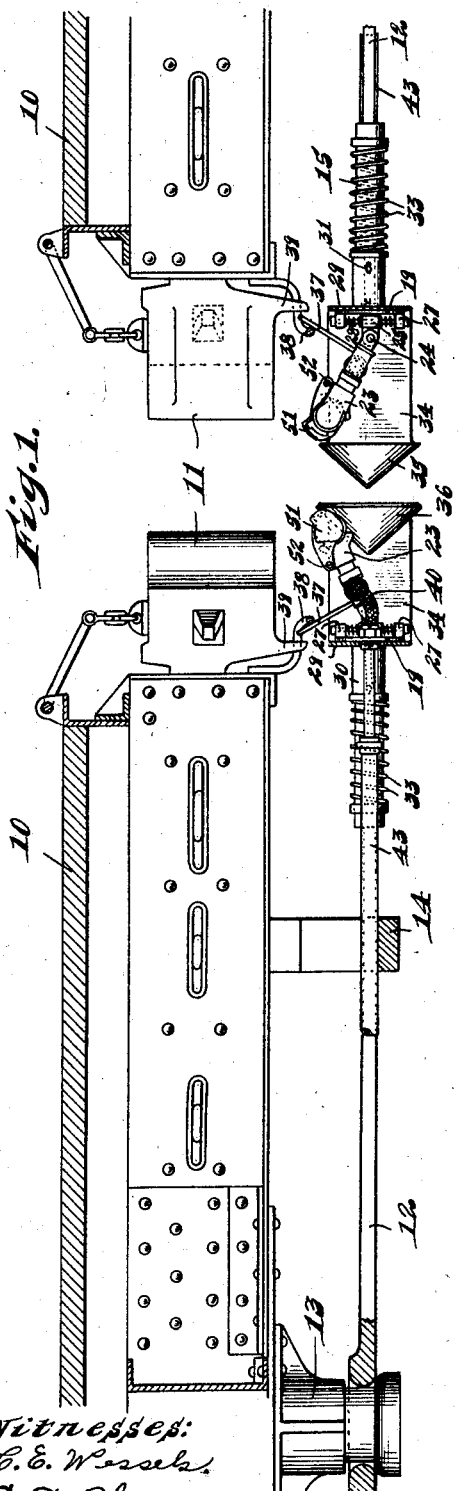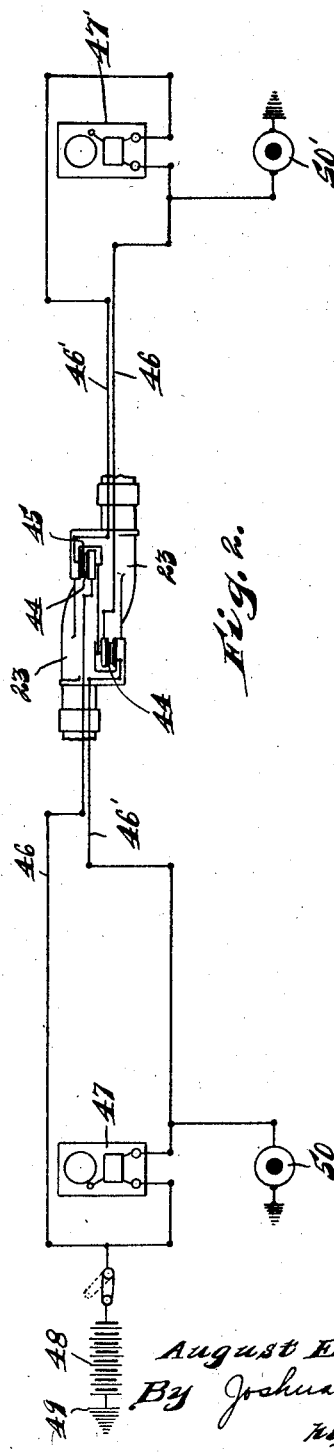

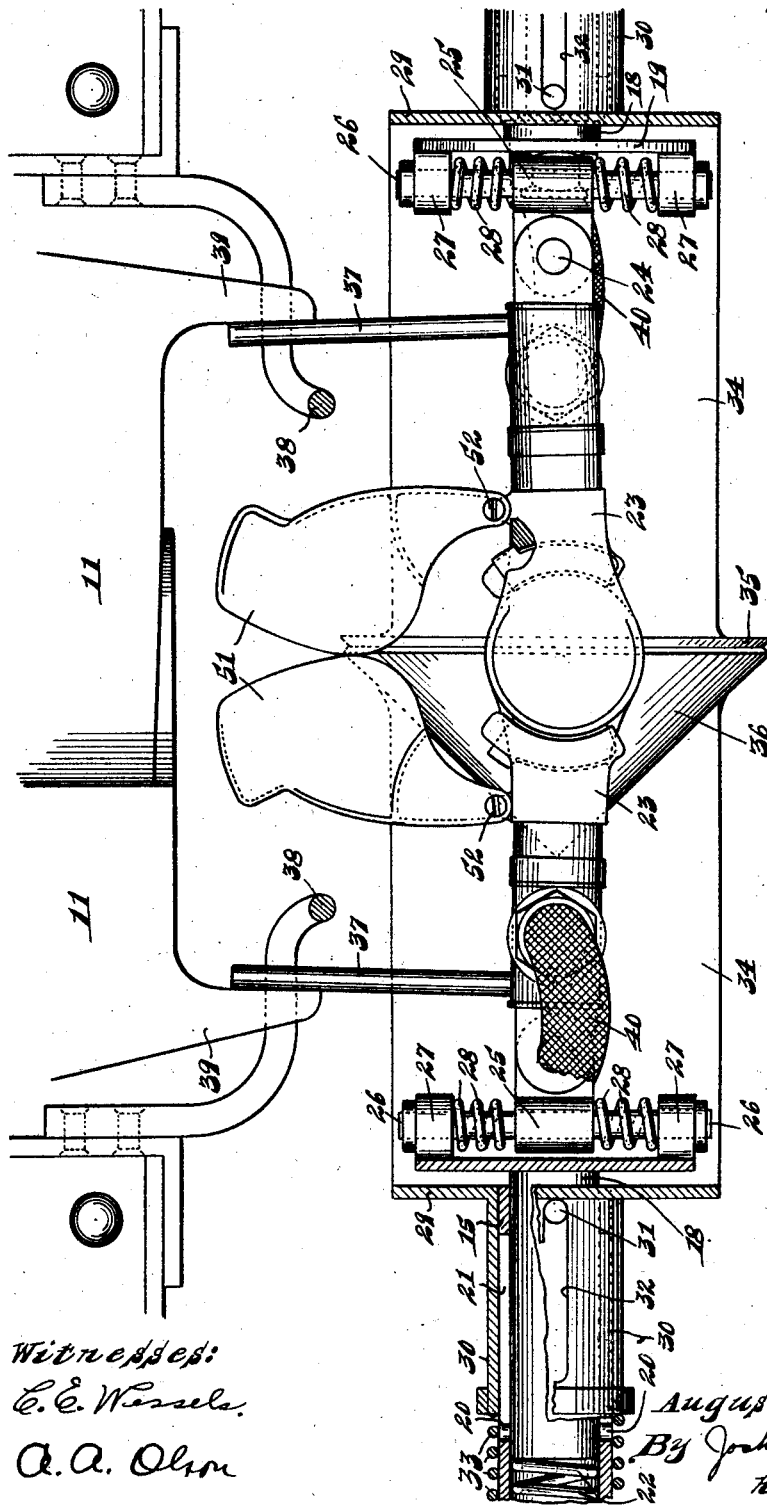

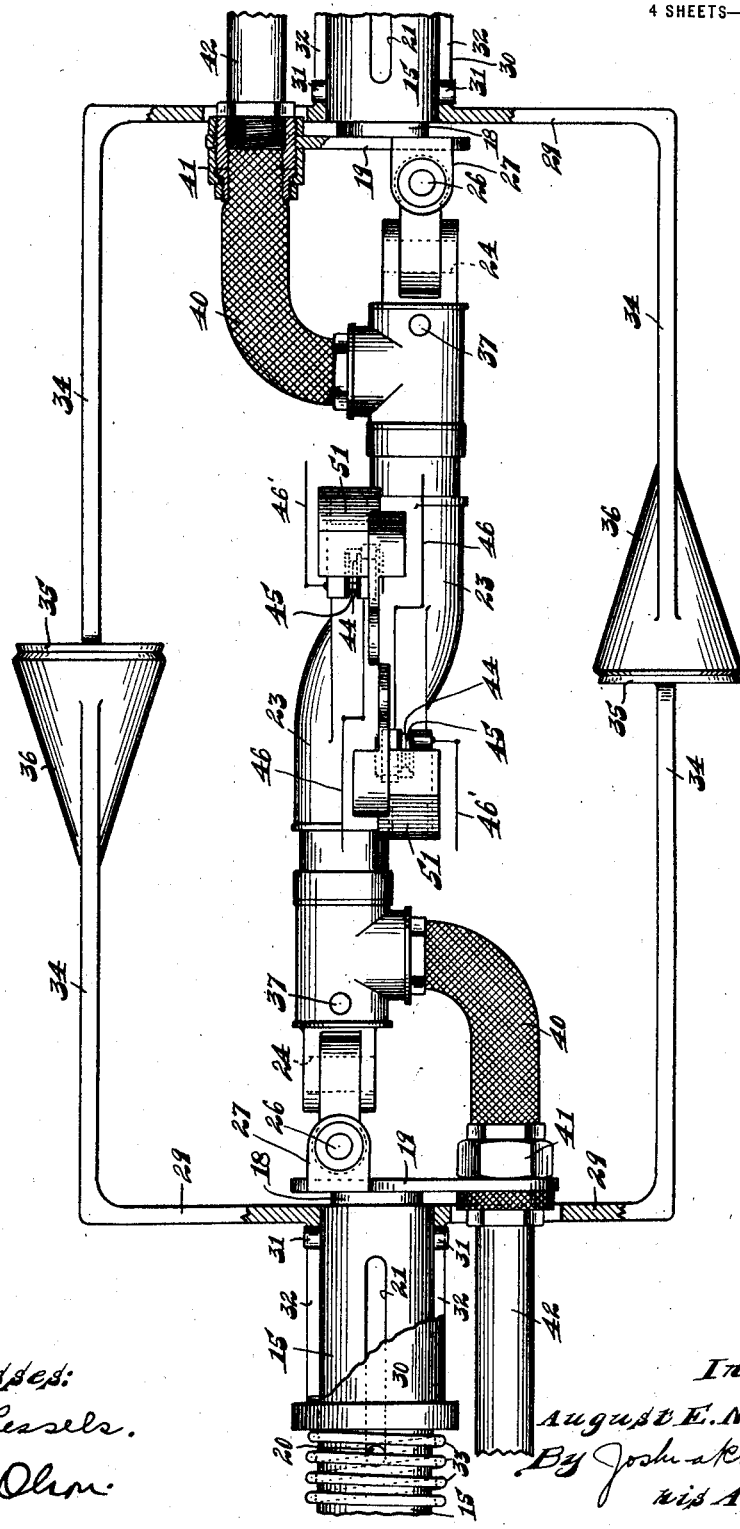

UNITED STATES PATENT OFFICE.

AUGUST E. NESCHER, OF CHICAGO, ILLINOIS.

FLUID-PIPE COUPLING FOR RAILWAY-CARS.

1,387,508.  Specification of Letters Patent.  Patented Aug. 16, 1921.

Application filed October 23, 1917. Serial No. 198,030.

*To all whom it may concern:*

Be it known that I, AUGUST E. NESCHER, a citizen of the United States, and a resident of the city of Chicago, county of Cook, and State of Illinois, have invented certain new and useful Improvements in Fluid-Pipe Couplings for Railway-Cars, of which the following is a specification.

My invention relates to improvements in fluid pipe couplings for railway cars, and has for its object the production of a device of this character through the medium of which fluid pipes, such as steam and compressed air pipes of railway cars, may be automatically connected or disconnected when the cars are connected or disconnected.

A further object is the production of a coupling as mentioned, which will also afford means for effecting automatic connection or disconnection between electrical circuits of cars in the connection or disconnection of the same.

A still further object is the production of a coupling as mentioned which will be of durable and economical construction, and highly efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a fragmentary side elevation of the adjacent ends of two conventional railway cars, about to be connected, equipped with coupling mechanism, embodying the invention, Fig. 2, a diagrammatic view of my coupling mechanism, showing the electric signal system used in connection therewith, Fig. 3, a partially sectional side elevation showing the coupling members engaged and interlocked with each other, Fig. 4, a partially sectional top plan view of the coupling, as seen in Fig. 3, Fig. 5, a partially sectional top plan view of one of the coupling members of the device, and Figs. 6 and 7, sections taken on substantially lines 6—6 and 7—7 respectively of Fig. 5.

The preferred form of construction as illustrated in the drawings is designed for use in connection with railway cars of conventional construction, the cars being indicated at 10 in Fig. 1. Said cars are equipped with the usual form of draw bars and couplings as seen at 11. Arranged immediately below each draw bar 11 is a bar 12, the rearward or inner end of which embraces the king pin 13 of the adjacent end of the car. The outer end of bar 12 is loosely supported upon a supporting element 14, the arrangement being such as to permit of movement of the outer end of the bar 12 in conformity with the movement of the corresponding draw bar 11, this being either vertical or horizontal, as will be readily understood by those skilled in the art.

The enlarged outer end of bar 12 is slidably embraced by a sleeve 15, as clearly seen in Fig. 5, said bar being provided with lateral projections 16 which engage with elongated slots 17 provided in said sleeve. Slidably mounted in the forward or outer end of sleeve 15 is a stem 18, carrying at its outer or forward end a plate 19. The stem 18 is provided with lateral projections 20 which slidably engage in elongated slots 21 provided in sleeve 15. Arranged in the sleeve 15, and interposed between the adjacent ends of bar 12 and stem 18, is a helical compression spring 22, which serves to normally hold said stem and hence the plate 19 at its outer terminal of movement, relative to the bar 12.

Provided at the front side of each plate 19 is a tubular coupling head or member 23 of conventional construction, the rearward end thereof being pivotally connected at 24 with a sleeve or collar 25, which is rotatably and shiftably mounted upon a stem or pin 26, fixed in lugs 27 on plate 19. Helical compression springs 28 engage against opposite ends of member 25 to normally hold the same substantially centrally upon pin 26. The arrangement is such, as will be seen, that the coupling head will be permitted universal pivotal movement, that is either horizontal or vertical pivoting. The arrangement is such, however, that the springs 28 will serve to normally hold the coupling head in central position as regards lateral or horizontal swinging of the same, relative to the plate 19.

In order to effect exact registration or centering of the two coupling members on the cars about to be coupled, each coupling head is provided with a plate 29 having a hub 30 which slidably embraces the outer end of the sleeve 15, said sleeve being provided with laterally projecting pins 31, which engage loosely with elongated slots 32 formed in said hub. The arrangement is such, as will be seen, that the plate 29 will be permitted to yield rearwardly independently of plate 19. Said plate 29 is however, held normally, at its outer terminal of movement, by means of a helical compression spring 33, which engages against the rearward end of hub 30. Projecting forwardly from the plate 29, at opposite sides of the coupling head are two arms 34, one of which carries at its forward end a male or conical head 35, the other arm being formed into a female or conical socket 36. With this arrangement as the car ends approach each other, the male member of each coupling device will engage with the female member of the other coupling device. Said male and female members will be fully engaged and seated in one another before the coupling heads 23 will contact with each other, thus serving to effectually center the coupling heads relative to each other before the same are brought into coöperative relation with each other. Continued movement of the cars toward each other, after the centering members have been interlocked with each other, will result in the rearward movement of the plates 29 against springs 33, as will be readily understood.

Projecting upwardly from each coupling head 23 is a pin or post 37, the upper end of which engages with a loop 38 secured to and projecting from the corresponding car coupling member 11. The arrangement is such, that when the coupling head 23 is at its outer terminal of movement or in inoperative position, the same will be held in upwardly inclined position, through engagement of the pin or post 37 with the loop 38, as clearly seen in Fig. 1. Upon rearward movement of the coupling heads, such as results when the draw bar couplings of adjoining trains are interlocked, the pin or post 37 of each coupling head will be carried into engagement with a depending lug or stop 39 on the corresponding draw bar 11, thereby serving to rock said coupling heads downwardly into operative relation, as clearly seen in Fig. 3. The member 37, engaging with the loop 38 on the draw bar of the car, serves also to establish a connection between these parts, so that, as the draw bar is shifted or pivoted laterally, as is required where cars are coupled on a curve, the coupling head 23 will move in unison therewith.

The rearward end of each coupling head 23 is connected to a flexible tube or hose 40 which in turn is connected through the medium of a union 41 with a rearwardly projecting pipe 42 on plate 19, which slidably engages with the conventional train fluid pipe 43 of the car in connection with which the device is employed. This sliding connection of the pipe 42 with the pipe 43 permits of depression or rearward movement of the plate 19 without interruption or obstruction.

With the construction set forth then it will be seen that in the coupling of two cars together, as the cars approach each other, the centering elements 35 and 36 of the car ends will be the first to engage with each other, in order to effect absolute centering of the coupling heads 23 before any engagement between the same is effected. Continued movement of the cars toward each other, then brings the coupling heads 23 into engagement with each other, and upon depression or rearward movement of said heads, through contact of the same with each other, the pin or post 37 engaging with the lugs 39 will effect automatic downward rocking of said coupling heads to horizontal or operative position. When said coupling heads are in this position the same are positively locked together as will be understood by those skilled in the art. The downward movement of said coupling heads will carry the same just past the dead center which will of course serve to yieldingly hold the same in operative relation with each other. When in this position the fluid pipes 43 of the coupled cars will be operatively connected, as will be readily understood. In the uncoupling and separation of the cars, after the draw bars have been uncoupled and the cars commence to separate or move from each other, the pins or posts 37 will be carried into engagement with the loops 38, which will cause upward swinging of the coupling heads 23 to effect unlocking of the same, the arrangement being such that when said coupling heads reach the upwardly inclined position seen in Fig. 1, the same will be completely unlocked so as to permit of uninterrupted movement of the same from each other. Thus it will be seen that in the coupling and uncoupling of the cars, the fluid pipes thereof will be automatically coupled or uncoupled.

Each coupling head 23 is provided with an electrical contact or brush 44 which is adapted, when the coupling heads are interlocked, as above described, to engage or contact with a brush 45, provided upon each of said couplings. Said brushes 44 and 45 of each coupling head are connected with circuit wires 46 and 46', so that when the coupling heads are interlocked as described, the conductor wire 46 of each car will be electrically connected with the conductor wire 46' of the other car. The wires 46 and 46' at each end of the train, that is in the locomotive and the caboose, will be connected together and in the terminal cars, that is, in the locomotive and the caboose will be arranged electric bells 47 and 47', or other electric device arranged in the circuit, formed by the wires 46 and 46', as will be readily understood. In the locomotive, preferably, will be provided a source of electrical energy 48, one side of which will be connected with the circuit wires 46 and 46', the other side being grounded as at 49. Also arranged in each of the terminal cars, that is in the locomotive and the tender, will be push buttons or switches 50 and 50', one side of each of which will be connected with the circuit wires 46 and 46', the other side thereof being grounded. With this arrangement it will be seen that the circuit through the bells 47 and 47' may be closed by the depression of either of the push buttons 50 or 50', thus making it possible for signaling between the locomotive and the caboose of the train. The contact brushes being carried by the coupling heads 23, the electrical connection described between adjacent cars of the train will be automatically made or broken upon coupling or uncoupling of the cars.

To protect the outer ends of the coupling members 23 against rain, sleet or other foreign substance, entering the same, or gathering upon the electrical contacts, each head will be provided with a cap or covering 51 pivoted to the head at 52. Said caps 51 will be adapted normally to inclose the top and inner side of each coupling head to fully protect the same, the arrangement being such, however, that as said coupling members are brought into operative relation with each other, said caps engaging with each other, will automatically swing upwardly out of the way so as to uncover said coupling heads and permit of interlocking of the heads. Upon uncoupling or disengagement of said coupling heads, said caps will drop again by gravity to operative or protecting position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A coupling of the class described for railway cars comprising a pair of coöperating oscillatory coupling members adapted, when the cars are brought together, to engage with each other, said members being mounted for slidable movement rearwardly and forwardly of said car; means mounted on said car for moving said member forwardly thereof; a stop mounted on said member; means mounted on the car to which said member is attached for engaging said stop upon rearward movement thereof for rocking said member downwardly; means mounted on said car for engaging said stop upon the forward movement thereof for rocking said member upwardly, substantially as described.

In testimony whereof, I have signed my name to this specification in the presence of two subscribing witnesses.

AUGUST E. NESCHER.

Witnesses:
   ARTHUR A. OLSON,
   JOSHUA R. H. POTTS.